(12) United States Patent
Reunamäki (10) Patent No.: US 8,260,332 B2
(45) Date of Patent: Sep. 4, 2012

(54) METHOD, APPARATUS AND COMPUTER PROGRAM PRODUCT FOR PRESENTING CALL RELATED MESSAGES TO A USER

(75) Inventor: Jukka Pekka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 249 days.

(21) Appl. No.: 12/620,206

(22) Filed: Nov. 17, 2009

(65) Prior Publication Data

US 2011/0117900 A1 May 19, 2011

(51) Int. Cl.
*H04W 4/00* (2009.01)
*H04M 1/725* (2006.01)

(52) U.S. Cl. ..................... 455/466; 455/412.1

(58) Field of Classification Search .................. 455/466, 455/412.1
See application file for complete search history.

(56) References Cited

U.S. PATENT DOCUMENTS

2005/0221771 A1* 10/2005 Himeno ........................ 455/90.3
2007/0238474 A1* 10/2007 Ballas et al. .................. 455/466
* cited by examiner

*Primary Examiner* — Kamran Afshar
*Assistant Examiner* — Omoniyi Obayanju
(74) *Attorney, Agent, or Firm* — Alston & Bird LLP (57) ABSTRACT

A method is provided for transmitting a communication request to a user device of a first communication type, receiving a message during the communication request or within a predetermined amount of time after the communication request, of a second communication type. If the message received is from the user device, then it may be immediately presented or displayed. If the message is not from the user device, then it is precluded from being presented until the communication request is completed. The first communication type may be in the form of a voice call and the user device may be a mobile phone. The second communication type may be a text message, E-mail, or other mode of communication that differs from the first communication type.

18 Claims, 7 Drawing Sheets

METHOD, APPARATUS AND COMPUTER PROGRAM PRODUCT FOR PRESENTING CALL RELATED MESSAGES TO A USER

FIELD OF INVENTION

Example embodiments of the present invention relate generally to communication requests initiated by a user and, in particular, to presenting messages to the user, in response to communication requests.

BACKGROUND

Communication has become fast, easy, and convenient through the advent of wireless networks and mobile devices that have also provided multiple methods for communication, including, for example, Short Message Service (SMS), Instant Message (IM) service, E-mail, and voice calls among others. People are able to use portable electronic devices (e.g., cellular telephones, personal digital assistants (PDAs), laptop computers, pagers, and the like) to compose short, quick messages that can be communicated to one another at any time and from nearly anywhere.

The ubiquity of communication devices and the ready-access with which most people have to these devices provide users access to multiple communication paths virtually 24-hours a day, regardless of location. Despite the near-constant connectivity of a person, they may not always be available to answer a call or otherwise respond to a communication request.

BRIEF SUMMARY

In general, exemplary embodiments of the present invention provide an improved method of responding to a communication request in a manner that is convenient for the responding user. In particular, the method of example embodiments provides for transmission of a communication request to a respondent's user device of a first communication type. The method of the example embodiments further provides for receiving a message during the communication request, or within a predetermined amount of time after the communication request, which is of a second communication type. The method of the example embodiments still further provides for determining if the message is from the respondent's user device, and if it is, provides for immediate presentation of the message. If the message is not from the respondent's user device, the message may be precluded from being presented during the communication request. The first communication type may be in the form of a voice call while the second communication type may be in the form of a text message. In one embodiment, the method may further comprise terminating the communication request upon receipt of the message if the message is from the respondent's user device. The predetermined time may be around 10 seconds. The message may be presented automatically, without user interaction, if the message is from the respondent's user device. The method may also comprise providing for presentation of an option to reply to the message, the reply being of a second communication type.

According to another embodiment of the invention, an electronic device is provided for transmitting a communication request to a respondent's user device of a first communication type, and receiving a message during the communication request, or within a predetermined amount of time after the communication request, which is of a second communication type. The electronic device may further provide for determining if the message is from the respondent's user device, and if it is, provide for immediate presentation of the message. If the message is not from the respondent's user device, the message may be precluded from being presented during the communication request. The first communication type may be in the form of a voice call while the second communication type may be in the form of a text message. The electronic device may further be configured to terminate the communication request upon receipt of the message if the message is from the respondent's user device. In one embodiment, the predetermined time may be around 10 seconds. The message may be presented automatically, without user interaction, if the message is from the respondent's user device. The electronic device may also provide for presentation of an option to reply to the message, the reply being of a second communication type.

According to yet another embodiment of the present invention, a computer program product is provided that comprises at least one computer-readable storage medium having computer-readable program instructions stored therein, the computer-readable program instructions configured to cause an apparatus to at least provide for transmission of a communication request to a respondent's user device of a first communication type. The computer-readable program instructions of this embodiment are further configured to cause the apparatus to receive a message during the communication request, or within a predetermined amount of time after the communication request, of a second communication type, and to determine if the message is from the respondent's user device. If the message is from the respondent's user device, the message may be immediately presented and if the message is not from the respondent's user device, the message may be precluded from being presented. The first communication type may be in the form of a voice call while the second communication type may be in the form of a text message. The computer program product may further be configured to cause the apparatus to terminate the communication request upon receipt of the message if the message is from the respondent's user device. The predetermined time of the embodiment may be around 10 seconds. The message may be presented automatically, without user interaction, if the message is from the respondent's user device. The computer program product may further be configured to cause the apparatus to for presentation of an option to reply to the message, the reply being of a second communication type.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
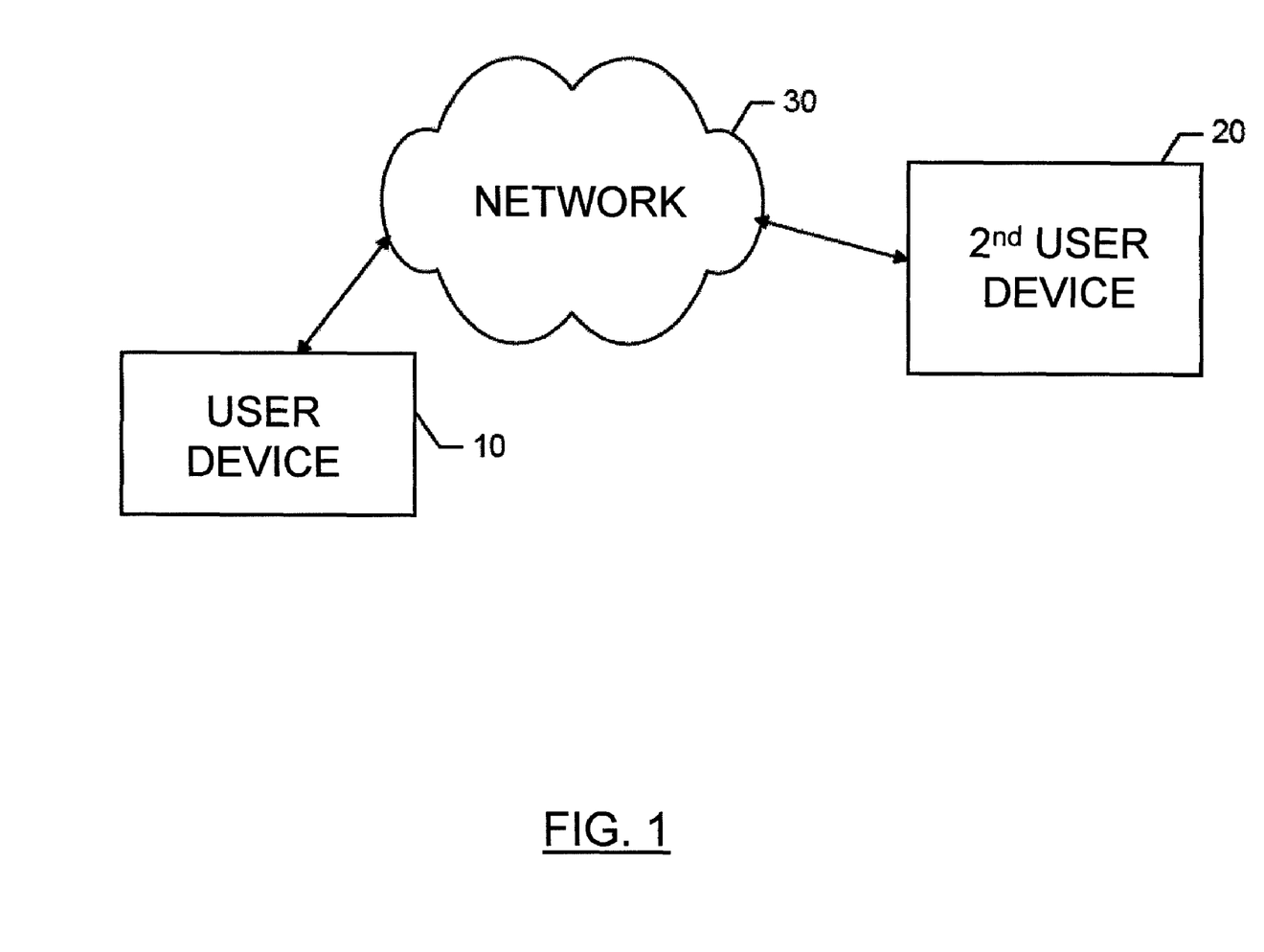
FIG. 1 illustrates an communication system in accordance with an example embodiment of the present invention.

A session may be supported by a network 30 as shown in FIG. 1 that may include a collection of various different nodes, devices or functions that may be in communication with each other via corresponding wired and/or wireless interfaces. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols. and/or the like.

One or more communication terminals such as the user device 10 and the second user device 20 may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the user device 10 and the second user device 20 via the network 30. By directly or indirectly connecting the user device 10 and the second user device 20 and other devices to the network 30, the user device 10 and the second user device 20 may be enabled to communicate with the other devices or each other, for example, according to numerous communication protocols including Hypertext Transfer Protocol (HTTP) and/or the like, to thereby carry out various communication or other functions of the user device 10 and the second user device 20, respectively.

In example embodiments, either of the user devices may be mobile or fixed communication devices. Thus, for example, the user device 10 and the second user device 20 could be, or be substituted by, any of personal computers (PCs), personal digital assistants (PDAs), wireless telephones, desktop computer, laptop computer, mobile computers, cameras, video recorders, audio/video players, positioning devices, game devices, television devices, radio devices, or various other devices or combinations thereof.

Figure 2:
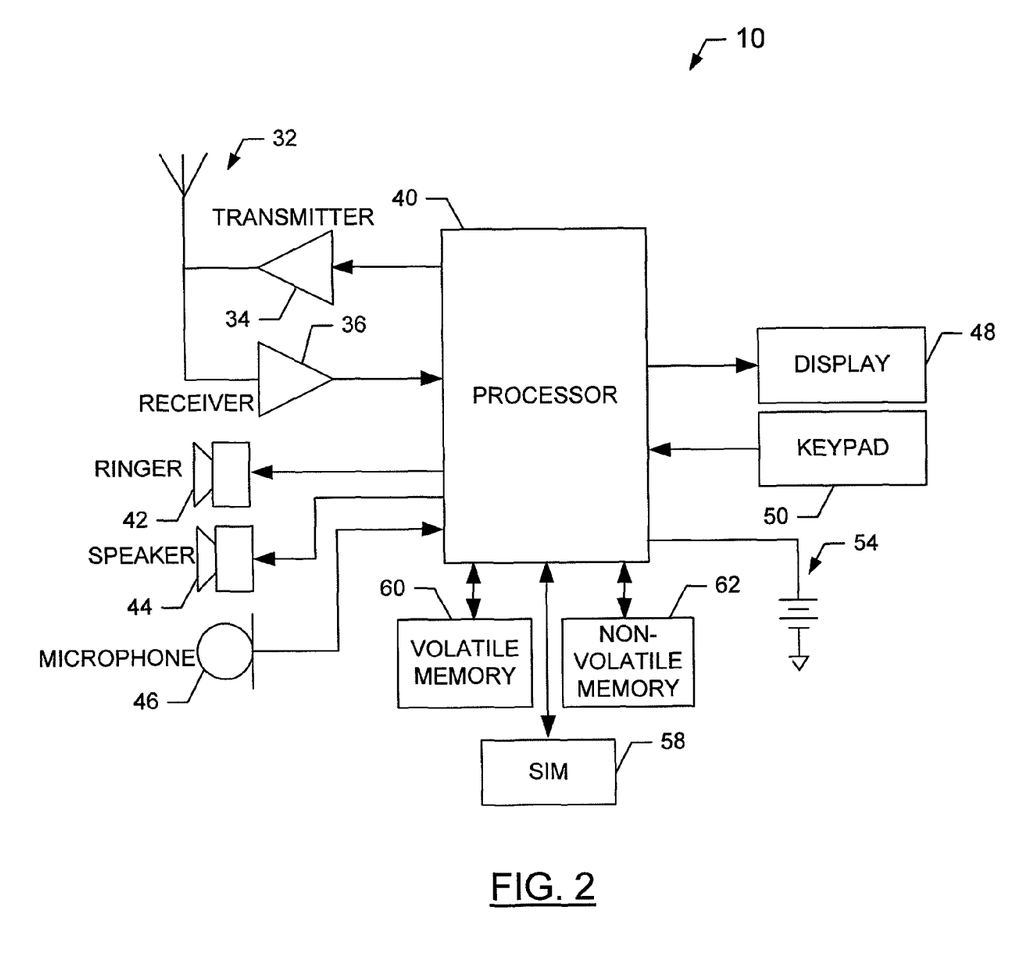
FIG. 2 is a schematic block diagram of a mobile device according to an example embodiment of the present invention.

Although the user device 10 may be configured in various manners, one example of a user device that could benefit from embodiments of the invention is depicted in the block diagram of FIG. 2. While several embodiments of the user device may be illustrated and hereinafter described for purposes of example, other types of user devices, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the present invention. As described, the user device may include various means for performing one or more functions in accordance with embodiments of the present invention, including those more particularly shown and described herein. It should be understood, however, that a user device may include alternative means for performing one or more like functions, without departing from the spirit and scope of the present invention.

The user device 10 illustrated in FIG. 2 may include an antenna 32 (or multiple antennas) in operable communication with a transmitter 34 and a receiver 36. The user device may further include an apparatus, such as a processor 40, that provides signals to and receives signals from the transmitter and receiver, respectively. The signals may include signaling information in accordance with the air interface standard of the applicable cellular system, and/or may also include data corresponding to user speech, received data and/or user generated data. In this regard, the user device may be capable of operating with one or more air interface standards, communication protocols, modulation types, and access types. By way of illustration, the user device may be capable of operating in accordance with any of a number of first, second, third and/or fourth-generation communication protocols or the like. For example, the user device may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved—UMTS terrestrial radio access network), with fourth-generation (4G) wireless communication protocols or the like.

It is understood that the apparatus, such as the processor 40, may include circuitry implementing, among others, audio and logic functions of the user device 10. The processor may be embodied in a number of different ways. For example, the processor may be embodied as various processing means such as processing circuitry, a coprocessor, a controller or various other processing devices including integrated circuits such as, for example, an ASIC (application specific integrated circuit), an FPGA (field programmable gate array), a hardware accelerator, and/or the like. In an example embodiment, the processor may be configured to execute instructions stored in a memory device or otherwise accessible to the processor. As such, the processor may be configured to perform the processes, or at least portions thereof, discussed in more detail below with regard to FIGS. 3 and 4. The processor may also include the functionality to convolutionally encode and interleave message and data prior to modulation and transmission. The processor may additionally include an internal voice coder, and may include an internal data modem.

The user device 10 may also comprise a user interface including an output device such as an earphone or speaker 44, a ringer 42, a microphone 46, a display 48, and a user input interface, which may be coupled to the processor 40. The user input interface, which allows the user device to receive data, may include any of a number of devices allowing the user device to receive data, such as a keypad 50, a touch display (not shown) or other input device. In embodiments including the keypad, the keypad may include numeric (0-9) and related keys (#,*), and other hard and soft keys used for operating the mobile terminal 10. Alternatively, the keypad may include a conventional QWERTY keypad arrangement. The keypad may also include various soft keys with associated functions. In addition, or alternatively, the user device may include an interface device such as a joystick or other user input interface. The user device may further include a battery 54, such as a vibrating battery pack, for powering various circuits that are used to operate the user device, as well as optionally providing mechanical vibration as a detectable output.

The user device 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the user device may be equipped with memory. For example, the user device may include volatile memory 60, such as volatile Random Access Memory (RAM) including a cache area for the temporary storage of data. The user device may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the user device to implement the functions of the user device. For example, the memories may include an identifier, such as an international mobile equipment identification (IMEI) code, capable of uniquely identifying the user device. Furthermore, the memories may store instructions for determining cell id information. Specifically, the memories may store an application program for execution by the processor 40, which determines an identity of the current cell, i.e., cell id identity or cell id information, with which the user device is in communication.

An example embodiment of a communication network in accordance with one example embodiment is presented by FIG. 1. The flowchart illustrating operations performed by or in relation to the network of an example embodiment is presented in FIG. 3 and may be performed, for example, by the user device such as shown in FIG. 2. It will be understood that each block of the flowcharts, and combinations of blocks in the flowcharts, may be implemented by various means, such as hardware, firmware, processor, circuitry and/or other device(s) associated with execution of software including one or more computer program instructions. For example, one or more of the procedures described above may be embodied by computer program instructions. In this regard, the computer program instructions which embody the procedures described above may be stored by a memory device 60, 62 of an apparatus, such as a client, employing an example embodiment of the present invention and executed by a processor 40 in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart block(s). These computer program instructions may also be stored in a computer-readable memory that may direct a computer or other programmable apparatus, e.g., the overlay network host, to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions. The function of each operation of the flowcharts described herein may be performed by a processor bringing about the operation or transformation set forth in the flow chart operations.

In general, example embodiments of the present invention provide a method for responding to an incoming communication request with a response that may not be of the same communication type of the communication requested. For example, a voice-call, which is a first communication type, to a user device may be replied to in the form of a Short Message Service (SMS) text message, Multimedia Messaging Service (MMS), Instant Message (IM), E-mail, or the like, each of which would constitute a second communication type.

Given the ubiquity of communication devices and the range of service providers, an individual may be reached by some form of communication device at virtually any time, at virtually any location. As such, people have grown accustomed to being able to communicate with one another whenever and wherever they are. Thus, when an individual attempts contact with another, for example via a voice-call to a mobile device, the individual placing the call expects that the person being called will be able to answer. However, it is often inconvenient or impolite for a person to answer a call depending on their location or the environment, such as a check-out line at a grocery store or while driving a motor vehicle. When the phone call placed by the individual goes unanswered, the individual may be offended or perplexed as to why the call was not answered. The individual placing the call may make a second attempt to call and may further inconvenience or otherwise disturb the recipient of the call. As such, it may be desirable to be able to be able to provide feedback from the recipient of the phone call to the individual placing the call, without answering the call.

Figure 3:
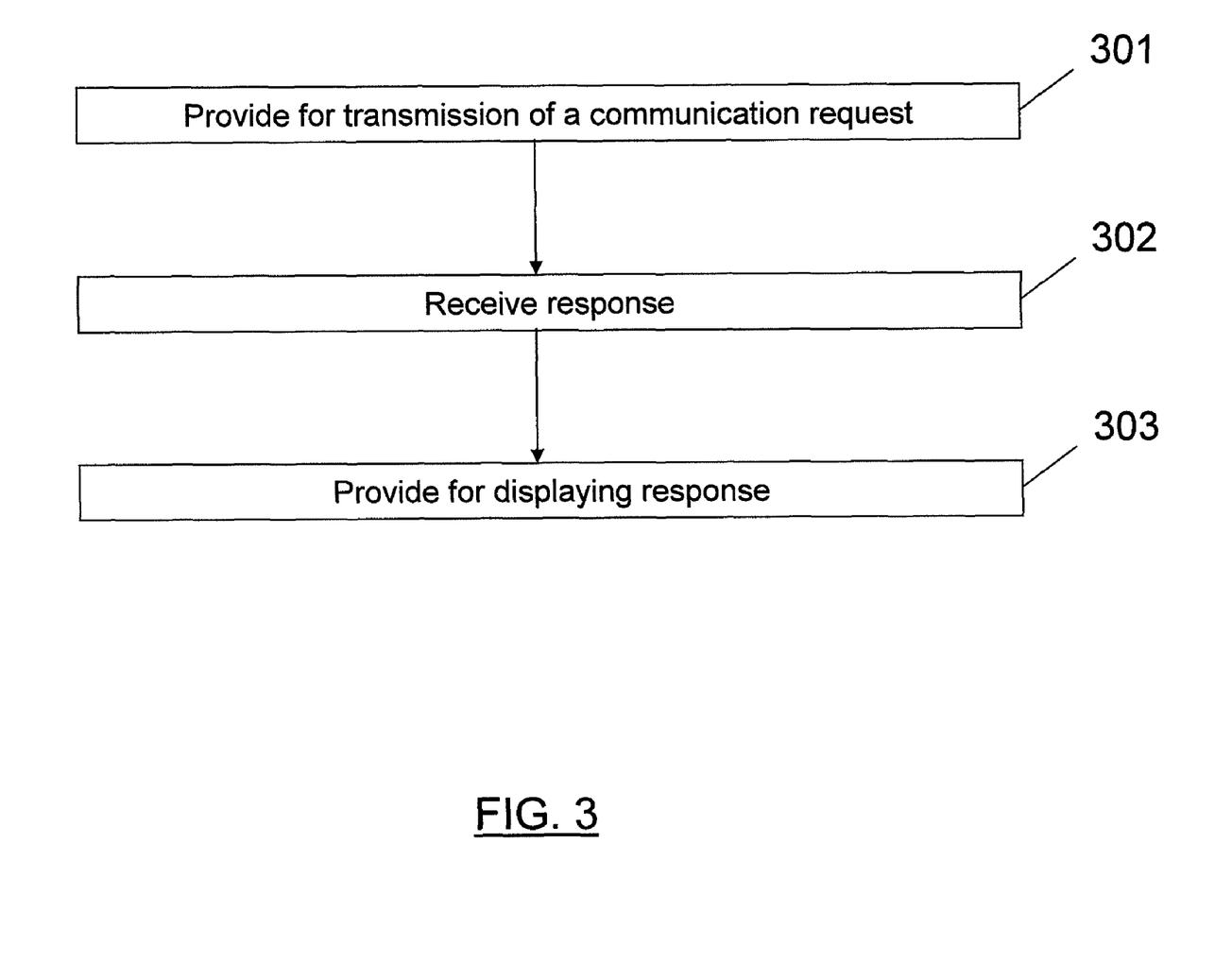
FIG. 3 is a flow chart of a method of communicating according to an example embodiment of the present invention.

An example embodiment of the present invention is illustrated in the flowchart of FIG. 3. A first user may initiate a communication request, for example by dialing a phone number. The first user device, or requesting user device, may provide for transmission of the communication request at operation 301. A second user device, or receiving user device, may receive the request for communication whereupon a decision is made to answer the request, ignore the request, or otherwise respond to the request. A response to the request may be received by the requesting user device at operation 302. The requesting user device may then display the response on a display at operation 303; however the response may also be in the form of an audible response, such as a voice message or possibly a responsive ring-tone, or a combination of audible and visual cues as will be discussed further.

The requesting user device implementing the operations of FIG. 3 may be a mobile device such as a cellular phone, a smart phone, or a PDA among others; however the first user device may also be a personal computer implementing a Voice Over Internet Protocol (VoIP), a telephone typewriter (TTY), a Telecommunication Device for the Deaf (TDD), or any other communication device. Similarly, the second user device may be any one of the aforementioned devices. Note that the first and second user devices may be of the same type or of different types.

Figure 4:
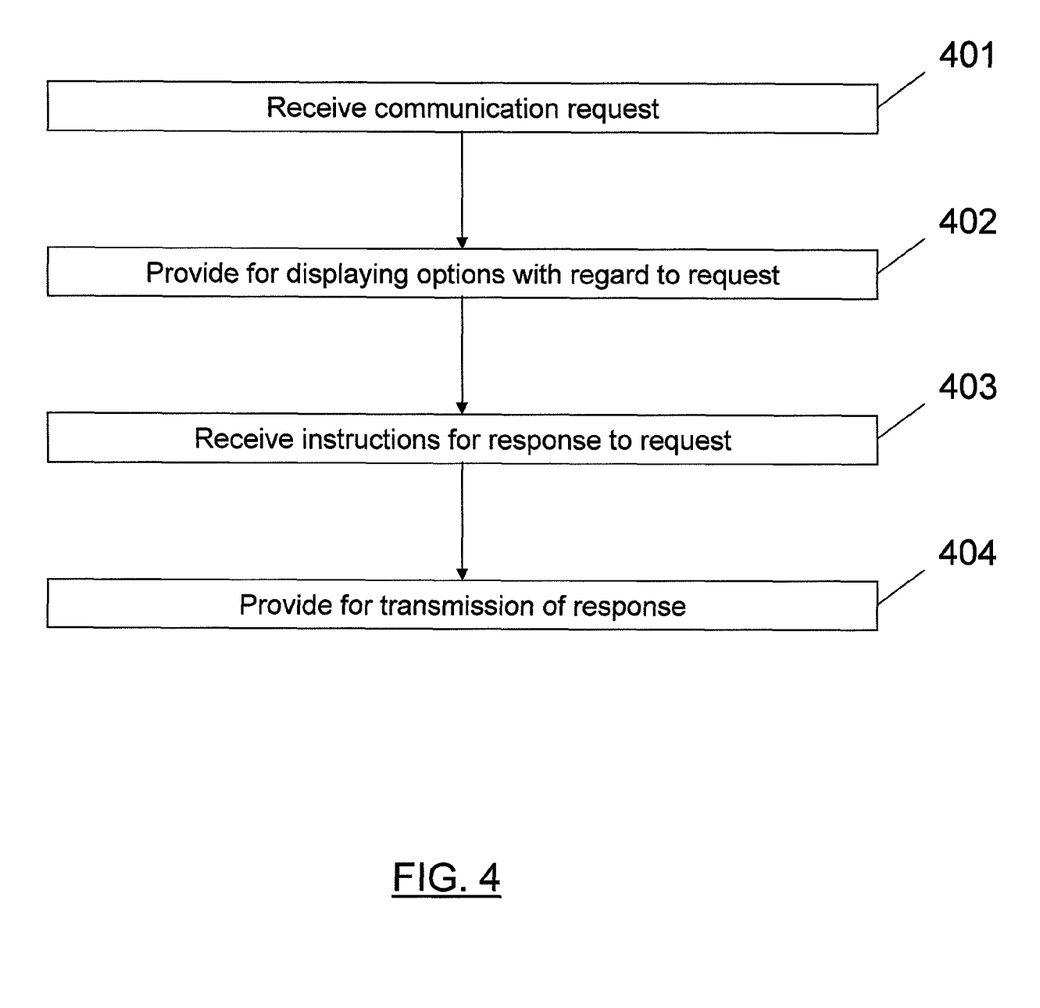
FIG. 4 is a flow chart of a method of communicating according to another example embodiment of the present invention.

FIG. 4 illustrates a flow chart of an example embodiment of the operations of the receiving user device which is receiving the communication request at operation 401 and may notify the user by ringing, vibrating, beeping, flashing, etc. The receiving user device may then provide the receiving user with options for responding to the communication request at operation 402. At operation 403, the receiving user may input instructions for responding to the request, which may be in the form of an SMS, IM, E-mail, etc. as described above. The response may then be transmitted at operation 404.

Figure 5:
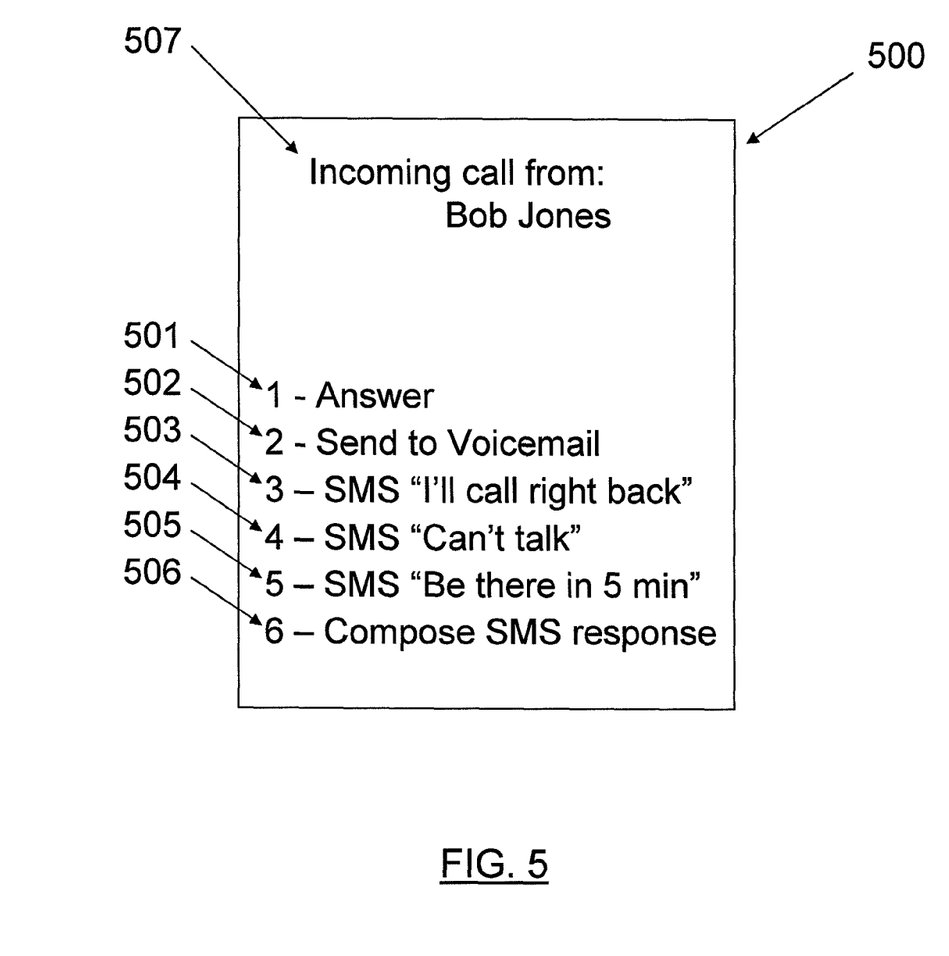
FIG. 5 illustrates a display of a responding device according to an example embodiment of the present invention.

An example embodiment of a display of a receiving device is illustrated in FIG. 5. The illustrated display 500 may be the display of a mobile communication device or of any communications device that includes a display. The display may also be a display screen in a vehicle such as a navigation screen that is configured to display information relating to a user's mobile device when the mobile device is synchronized with the vehicle's navigation or media system. When a communication request is received by the receiving device, the display 500 of the receiving device may display an identification 507 of the requesting device, which in the illustrated embodiment is "Bob Jones." Upon receiving the request, the receiving device may provide options to the user of the receiving device for responding to the request. In the illustrated embodiment, these options include answering the phone call 501, sending the request to voicemail 502, replying to the request with an SMS text message of "I'll call right back" at 503, replying to the request with an SMS text message of "Can't talk" at 504, replying to the request with an SMS text message of "Be there in 5 min" at 505, or the option to compose a different SMS text response at 506. The options in the illustrated embodiment may be accessed by pressing a corresponding numerical key, or if the receiving device display 500 is a touch-sensitive display, the user may only need to touch the desired option. While the embodiment of FIG. 5 shows options presented on a display, the options may be presented through a voice user-interface such that an option can be presented and selected without the user viewing a display, but rather with a voice presentation of options and a voice recognition of the selection of the desired option. Similarly, options may be presented visually and responded to via voice, or conversely options may be presented though an audio device, and responded to with a touch or button press. Upon selecting an option, the receiving device may respond to the communication request appropriately. The options illustrated may be customizable by the user of the receiving device such that specific SMS text messages are available or other options may be included, such as forwarding a call to another number or responding in a communications type and with content that are both user selectable. While the options illustrated only include answering the communication request, sending the request to voicemail, and SMS text messages, other types of responses are possible including IM, E-mail, etc. The pre-defined SMS text messages of the embodiment of FIG. 5 may provide a one-touch response for the receiving user when a detailed response is not possible, such as when in a meeting. Further, the communications request may include an identifier of the type of device making the communications request which may identify the capabilities of the requesting device. The options available on the receiving device may vary according to the capabilities of the requesting device so that only options available on the receiving device are presented to the second user. The communications request may specifically include the capabilities of the requesting device or the communications request may include an identifier specifying the type of device making the communications request such that the receiving device may look up the capabilities of the requesting device. For example, a text message response may not be possible if the requesting device is someone's land-line touch-tone telephone. Further, a user that is initiating the communications request may have preferences set for their device that only present the preferred options to a receiving device. The options presented to the user of the receiving device may be presented according to preferences set in the receiving user device such that if a communications request is from a "work" contact, a first set of options are available, possibly with more formal responses, while if a communications request is from a "friend," a second set of less formal responses are available.

Figure 6:
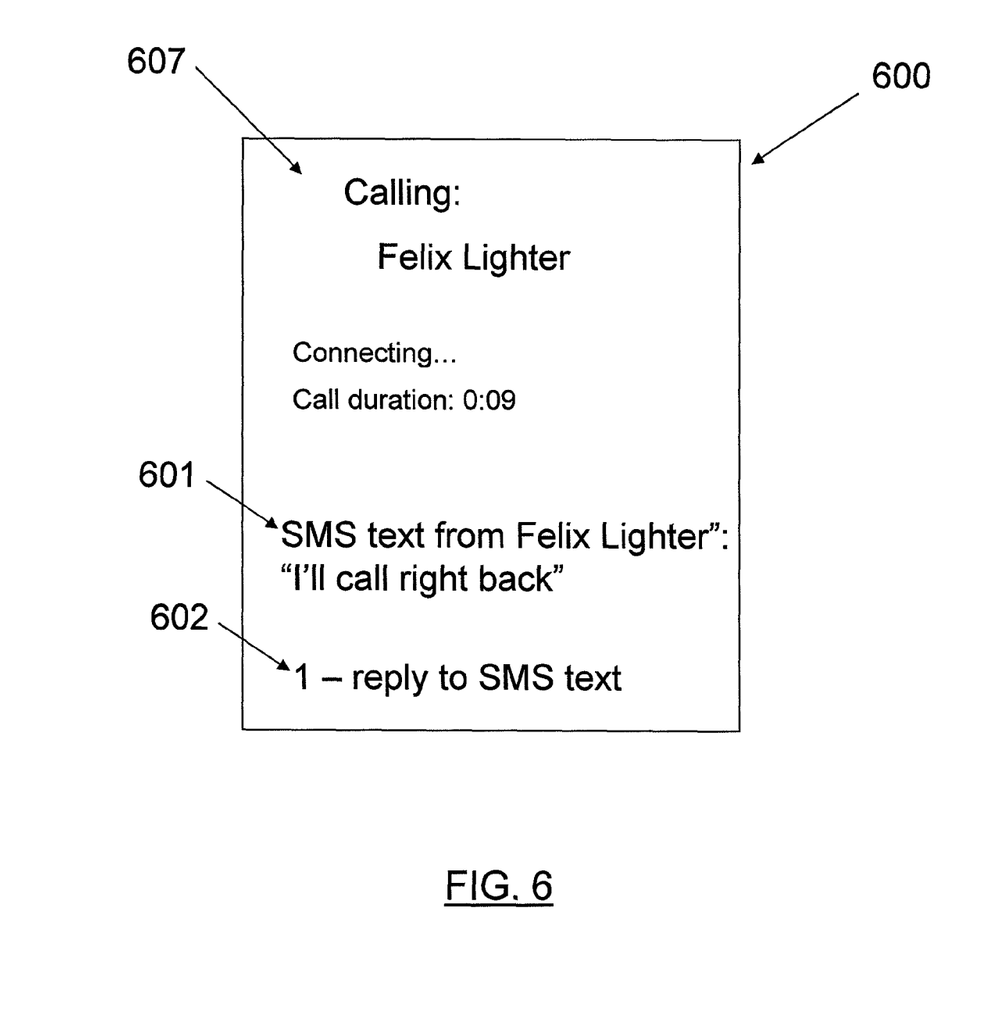
FIG. 6 illustrates a display of a requesting device according to an example embodiment of the present invention.

FIG. 6 illustrates an example embodiment of a display of a requesting device placing a call. As indicated on the display 600, a communication request in the form of a call is being transmitted to "Felix Lighter" as indicated by the identifier 607. Below the identifier 607 is an indication of status which may show the status of the call which, in the illustrated embodiment, is "connecting" as the call has not yet been answered. Illustrated at 601 is an SMS text message response from the person to which the call is directed. While the illustrated embodiment shows a heading of "SMS text from Felix Lighter", this heading may not be necessary as in some embodiments, a message will only be displayed on the requesting device if the message is from the device receiving the request. Such an embodiment may preclude confusion if multiple messages are being received by the requesting device during a communication request. Further, the requesting device may indicate on the display 600 that there are further options with respect to the communication request. If a message 601 is received from the receiving device, an option 602 may be available to reply to the message 601. Such an option may also terminate the communication request such that a call does not proceed to voicemail.

Figure 7:
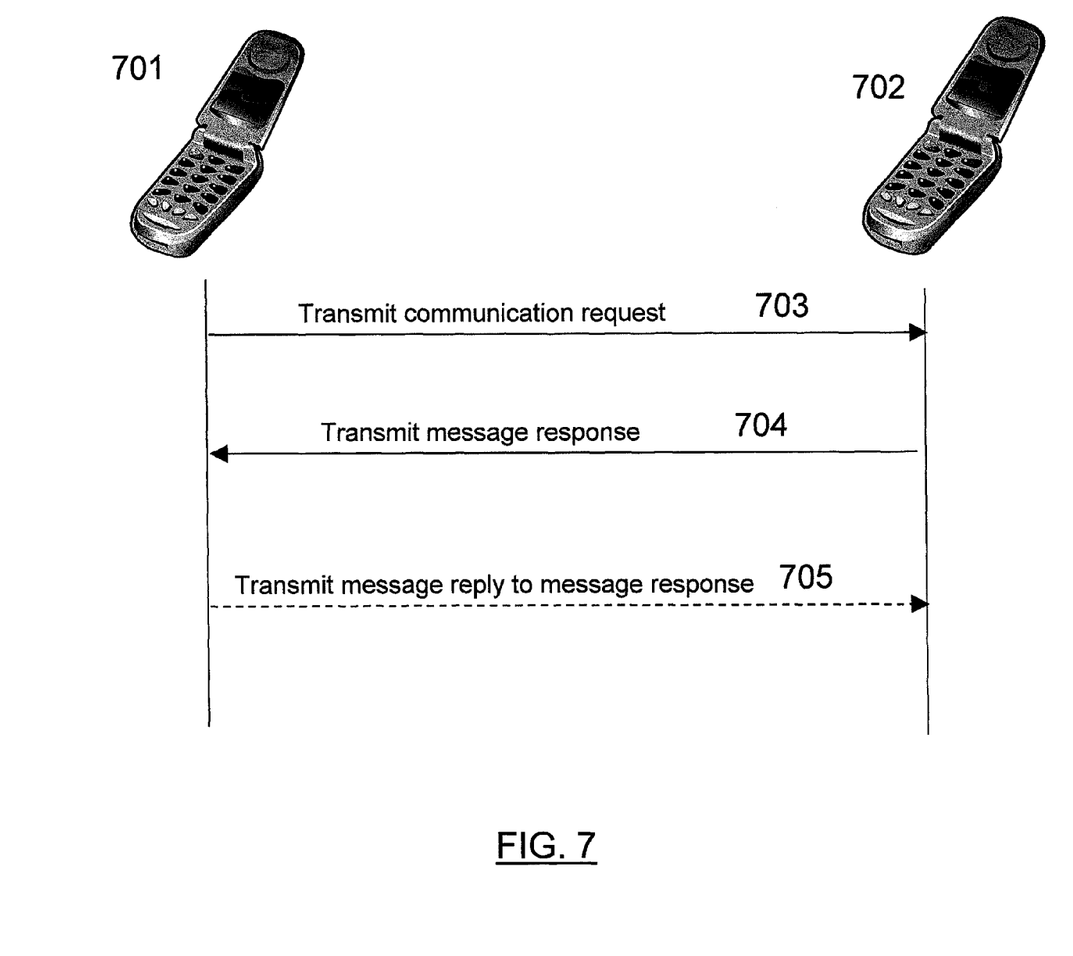
FIG. 7 illustrates message flow for a method of communicating according to an example embodiment of the present invention.

FIG. 7 is an illustration of the signal flow between a requesting device 701 and a receiving device 702. A communication request 703 is transmitted from the requesting device

701 to the responding device 702 of a first communication type. The responding device 702 may then transmit a message 704 responding to the communication request of a second communication type that is different from the first communication type. The requesting device 701 may then reply to the message response 705 of the second communication type if desired.

Example embodiments of the present invention have been presented as occurring during a communication request; however, there may be a time function associated with the communication request. For example, a communication request may be received by the responding device and the user may have the options presented in FIG. 5 for the duration of the communication request, and possibly for a set amount of time after the communication request, thus allowing a user more time to respond to the request. This time may be a fixed value, or it may be adjustable by a user of the responding device. The requesting device may include a similar time function that allows responses from the responding device to be received an amount of time after the communication request was placed. This time function may be appropriate when the requesting device is configured to only allow responses from the responding device during the communication request, and possibly for an amount of time after the communication request was ended.

In addition to SMS text messages, the responding device may be configured to transmit responses of other communication types such as a digital picture response, an E-mail response, an audible response, or any variety of methods that mobile devices are capable of sending and receiving.

Another example embodiment of the present invention may include a responding device that is configured to respond to a communication request without requiring user intervention. Such an embodiment may be used, for example, when an individual is in a meeting. The user of the responding device may configure the responding device to automatically respond with a message that indicates the responding user is in a meeting or is otherwise unavailable, thus not requiring the user to actively respond to a request for communication.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    providing for transmission of a communication request to a user device of a first communication type;
    receiving a message that is of a second communication type which is different than the first communication type, wherein receiving a message that is of a second communication type occurs during a period of time including both during the communication request and for a predetermined time after the communication request;
    determining if the message is from the user device;
    providing for presentation of the message in response to the message being determined to be from the user device; and
    precluding presentation of the message in response to the message being determined to not be from the user device during the period of time.

2. A method according to claim 1, wherein the first communication type is a voice call.

3. A method according to claim 2, wherein the second communication type is a text message.

4. A method according to claim 1, further comprising terminating the communication request upon receipt of the message in response to the message being determined to be from the user device.

5. A method according to claim 1, wherein the message is presented automatically in response to the message being determined to be from the user device.

6. A method according to claim 1, further comprising providing for presentation of an option to reply to the message in the second communication type.

7. An apparatus comprising at least one processor and at least one memory including computer program code, the at least one memory and the computer program code configured to, with the at least one processor, cause the apparatus to at least perform:
    providing for transmission of a communication request to a user device of a first communication type;
    receiving a message that is of a second communication type which is different than the first communication type, wherein receiving a message that is of a second communication type which is different than the first communication type occurs during a period of time including both during the communication request and for a predetermined time after the communication request;
    determining if the message is from the user device;
    providing for presentation of the message in response to the message being determined to be from the user device; and
    precluding presentation of the message in response to the message being determined to not be from the user device during the period of time.

8. An apparatus according to claim 7, wherein the first communication type is a voice call.

9. An apparatus according to claim 8, wherein the second communication type is a text message.

10. An apparatus according to claim 7, wherein the at least one memory and the computer program code are configured to, with the at least one processor, cause the apparatus to terminate the communication request upon receipt of the message in response to the message being determined to be from the user device.

11. An apparatus according to claim 7, wherein the at least one memory and the computer program code are configured to, with the at least one processor, cause the apparatus to, in response to the message being determined to be from the user device, provide for presentation of the message.

12. An apparatus according to claim 7, wherein the at least one memory and the computer program code are configured to, with the at least one processor, cause the apparatus to provide for presentation of an option to reply to the message in the second communication type.

13. A computer program product comprising at least one non-transitory computer-readable storage medium having computer-executable program code instructions stored therein, the computer-executable program code instructions comprising:

> program code instructions for providing for transmission of a communication request to a user device of a first communication type;
> program code instructions for receiving a message that is of a second communication type which is different than the first communication type, wherein receiving a message that is of a second communication type occurs during a period of time including both during the communication request and for a predetermined time after the communication request;
> program code instructions for determining if the message is from the user device;
> program code instructions for providing for presentation of the message in response to the message being determined to be from the user device; and
> program code instructions for precluding presentation of the message in response to the message being determined to not be from the user device during the period of time.

14. The computer program product of claim 13, wherein the first communication type is a voice call.

15. The computer program product of claim 14, wherein the second communication type is a text message.

16. The computer program product of claim 13, further comprising program code instructions for terminating the communication request upon receipt of the message in response to the message being determined to be from the user device.

17. The computer program product of claim 13, wherein the message is presented automatically in response to the message being determined to be from the user device.

18. The computer program product of claim 13, further comprising program code instructions for providing for presentation of an option to reply to the message in the second communication type.

* * * * *